US007340240B2

(12) United States Patent
McDonald

(10) Patent No.: US 7,340,240 B2
(45) Date of Patent: Mar. 4, 2008

(54) MONITORING DEVICE

(75) Inventor: Andrew McDonald, Osaka (JP)

(73) Assignees: Sanyo Electric Co., Ltd., Osaka (JP); Sanyo Telecommunications Co., Ltd., Osaka (JP)

( * ) Notice: Subject to any disclaimer, the term of this patent is extended or adjusted under 35 U.S.C. 154(b) by 792 days.

(21) Appl. No.: 10/797,328

(22) Filed: Mar. 9, 2004

(65) Prior Publication Data

US 2005/0040953 A1 Feb. 24, 2005

(30) Foreign Application Priority Data

Mar. 12, 2003 (JP) ............................ 2003-067131

(51) Int. Cl.
*H04M 11/04* (2006.01)

(52) U.S. Cl. .............................. 455/404.1; 455/404.2; 340/573.1; 340/539.11; 379/38

(58) Field of Classification Search ............ 455/404.1, 455/404.2; 379/37-50; 340/573.1, 539.11
See application file for complete search history.

(56) References Cited

U.S. PATENT DOCUMENTS 3,989,900 A * 11/1976 Dibner ....................... 379/50
4,524,243 A * 6/1985 Shapiro ....................... 379/38
6,359,557 B2 * 3/2002 Bilder ....................... 340/531
6,696,956 B1 * 2/2004 Uchida et al. .......... 340/573.1

FOREIGN PATENT DOCUMENTS

| | | | |
|---|---|---|---|
| JP | 07-079191 | | 3/1995 |
| JP | 08-163538 | | 6/1996 |
| JP | 08-223637 | | 8/1996 |
| JP | 2001-28644 | | 1/2001 |
| JP | 2001-127896 | * | 5/2001 |
| JP | 2002-232598 | | 8/2002 |
| KR | 2001-0228635 | | 4/2001 |

* cited by examiner

*Primary Examiner*—Melur Ramakrishnaiah

(57) ABSTRACT

The present invention includes a mobile telephone having a radio transmit/receive function, and a control unit 109 that detects key input operations by a user, and has the mobile telephone transmit an emergency notification message to a predetermined address stored in a storage unit 112 when notified by a timer unit 111 that a preset period has elapsed since a key input operation was last detected.

17 Claims, 4 Drawing Sheets

FIG.2

| KEY INPUT TYPE | OPERATION CONTENT |
|---|---|
| POWER INPUT KEY | POWER ON |
| MENU KEY | MENU DISPLAY OPERATION |
| CALL KEY | MAKE A TELEPHONE CALL |
| EMAIL TRANSMISSION KEY | TRANSMIT EMAIL |
| . . . . . | . . . . . |

MONITORING DEVICE

BACKGROUND OF THE INVENTION

1. Field of the Invention

The present invention relates to a monitoring device that includes the radio transmit/receive function of a mobile telephone, and in particular to a monitoring device that confirms the safety of people living alone such as the elderly, and notifies of any emergencies.

2. Related Art

Currently, the number of people 65 years and over living alone is estimated to be three million in Japan and nearly ten million in the United States, figures that are predicted to rise steeply.

Since there is nobody around to look out for elderly people when they are living alone, if they suddenly fall ill or meet with an accident, nobody realizes immediately what has happened. Being able to quickly provide the appropriate care in such situations is essential to saving lives.

As such, a number of technologies have been disclosed for confirming the safety of elderly people living alone.

For example, Japanese published patent application no. 2001-357475 discloses technology in which a sensor is provided to detect how many times a person operates a specific object (e.g. toilet door) used in daily life. The detected usage frequency is notified to a safety confirmation center via a telephone line, and the safety of the person is inferred on the basis on the notified usage frequency.

Also, Japanese published patent application no. 2000-138761 discloses a system that monitors the operation status of an oft-used household electrical appliance (e.g. electric airpot), and sends the operation status to an entity/person monitoring the operation status.

While these two technologies can be applied when a person is at home, they are not, however able to confirm a person's safety outside of the home environment.

SUMMARY OF THE INVENTION

In view of this issue, the present invention aims to provide a monitoring device capable of confirming the safety of elderly people irrespective of whether or not they are at home.

(1) To realize this object, the present invention is a monitoring device that includes a mobile telephone having a radio transmit/receive function; an operation detection unit operable to detect a key input operation by a user; and a transmission control unit operable to have the mobile telephone transmit an emergency notification message to a predetermined address when a preset period has elapsed since the key input operation was last detected.

Also, the present invention is a monitoring method in a monitoring device that includes a mobile telephone having a radio transmit/receive function, the method including the steps of detecting a key input operation by a user; and having the mobile telephone transmit an emergency notification message to a predetermined address, when a preset period has elapsed since the key input operation was last detected.

Since the possibility that some sort of emergency has occurred is detected irrespective of whether or not the user is at home, and a message indicating this fact is sent to a specific entity/person, the entity/person is easily able to confirm the user's safety according to these structures.

(2) In (1) above, the transmission control unit may be configured to have the mobile telephone transmit the emergency notification message when the preset period has elapsed since the key input operation was last detected, only within a preset timeslot.

Since time periods during which there is a strong likelihood of operations not being detected despite there being nothing wrong, such as when the user is sleeping, are not targeted for detection according to this structure, the sending of emergency notification messages by mistake can be effectively avoided.

(3) In (2) above, the monitoring device may further include a position information acquisition unit operable to acquire position information showing a current position of the monitoring device; and a position-shift judgment unit operable to judge whether the position of the monitoring device has shifted, based on the acquired position information. Furthermore, the transmission control unit may be configured to have the mobile telephone transmit the emergency notification message to the predetermined address, only when the position has not shifted.

Since it is possible, according to this structure, to avoid emergency notification messages being sent in cases such as when a key operation is not performed for extended periods of time because of the user riding a train, for example, more reliable detection of emergencies is made possible.

(4) In (3) above, the monitoring device may further include a warning generation unit operable, when the preset period has elapsed, to emit a warning indicating that the preset period has elapsed, and the transmission control unit may be configured to have the mobile telephone transmit the emergency notification message to the predetermined address, only when the key input operation is not detected within a predetermined period after the warning is emitted.

Since it is possible, according to this structure, to let the user know when a key operation has not been performed for an extended period of time because of the monitoring device not being close at hand or the user taking a nap, for example, the incidence of mistaken emergency notification messages being sent can be reduced.

(5) in (4) above, the monitoring device may further include a time clocking unit operable to clock time; an operation history recording unit operable to record operation history information that includes a content of the detected key input operation and a detection time clocked by the time clocking unit on a recording medium whenever the key input operation by the user is detected; a call reception unit operable to receive a call request message from another communication terminal; and a code judgment unit operable to judge whether the received call request message includes an acquisition request identification code showing the call request message to be an acquisition request for operation history information. Furthermore, the transmission control unit may be configured to have the mobile telephone transmit the operation history information recorded on the recording medium to the other communication terminal if the acquisition request identification code is included.

Since the entity/person monitoring emergencies is able, on demand, to acquire operation history information that provides data for determining whether or not an emergency has occurred, it is possible, according to this structure, to gauge the user's situation.

(6) In (5) above, the monitoring device may further include a ringer operable to sound off when the call request message is received; and an inhibiting unit operable to inhibit the sounding off of the ringer when the acquisition request identification code is included in the received call request message.

Since the entity/person monitoring emergencies is able, on demand and without the user's knowledge, to acquire operation history information that provides data for determining whether or not an emergency has occurred, it is possible, according to this structure, to gauge the user's situation.

(7) In (3) above, the monitoring device may further include a position judgment unit operable to judge whether the position shown by the acquired position information is within a predetermined range, and the position-shift judgment unit may be configured to judge whether the position of the monitoring device has shifted, based on the acquired position information, only when the position shown by the acquired position information is outside the predetermined range.

According to this structure, it is possible to automatically determine whether or not the monitoring device is on premises (e.g. the home), where the precision of position information is impaired. When the monitoring device is on premises, emergencies are assessed without performing redundant processing to determine positional shifts, and when the monitoring device is off premises, positional shifts are determined and emergencies judged to have occurred if there have been no positional shifts. As a result, acquired position information can be used effectively, and emergencies assessed efficiently.

(8) In (7) above, the monitoring device may further include a warning generation unit operable, when the preset period has elapsed, to emit a warning indicating that the preset period has elapsed, and the transmission control unit may be configured to have the mobile telephone transmit the emergency notification message to the predetermined address, only when the key input operation is not detected within a predetermined period after the warning is emitted.

Since it is possible, according to this structure, to let the user know when a key operation has not been performed for an extended period of time because of the monitoring device not being close at hand or the user taking a nap, for example, the incidence of mistaken emergency notification messages being sent can be reduced.

(9) In (7) or (8) above, the monitoring device may further include a time clocking unit operable to clock time; an operation history recording unit operable to record operation history information that includes a content of the detected key input operation and a detection time clocked by the time clocking unit on a recording medium whenever the key input operation by the user is detected; a call reception unit operable to receive a call request message from another communication terminal; and a code judgment unit operable to judge whether the received call request message includes an acquisition request identification code showing the call request message to be an acquisition request for operation history information Furthermore, the transmission control unit may be configured to have the mobile telephone transmit the operation history information recorded on the recording medium to the other communication terminal if the acquisition request identification code is included.

Since the entity/person monitoring emergencies is able, on demand, to acquire operation history information that provides data for determining whether or not an emergency has occurred, it is possible, according to this structure, to gauge the user's situation.

(10) In (9) above, the monitoring device may further include a ringer operable to sound off when the call request message is received; and an inhibiting unit operable to inhibit the sounding off of the ringer when the acquisition request identification code is included in the received call request message.

Since the entity/person monitoring emergencies is able, on demand and without the user's knowledge, to acquire operation history information that provides data for determining whether or not an emergency has occurred, it is possible, according to this structure, to gauge the user's situation.

(11) In (1) above, the monitoring device may further include a position information acquisition unit operable to acquire position information showing a current position of the monitoring device; and a position-shift judgment unit operable to judge whether the position of the monitoring device has shifted, based on the acquired position information, and the transmission control unit may be configured to have the mobile telephone transmit the emergency notification message to the predetermined address, only when the position has not shifted.

Since it is possible, according to this structure, to avoid emergency notification messages being sent in cases such as when a key operation is not performed for extended periods of time because of the user riding a train, for example, more reliable detection of emergencies is made possible.

(12) In (1) or (2) above, the monitoring device may further include a warning generation unit operable, when the preset period has elapsed, to emit a warning indicating that the preset period has elapsed, and the transmission control unit may be configured to have the mobile telephone transmit the emergency notification message to the predetermined address, only when the key input operation is not detected within a predetermined period after the warning is emitted.

Since it is possible, according to this structure, to let the user know when a key operation has not been performed for an extended period of time because of the monitoring device not being close at hand or the user taking a nap, for example, the incidence of mistaken emergency notification messages being sent can be reduced.

(13) In any of (1) to (3) above, the monitoring device may further include a time clocking unit operable to clock time; an operation history recording unit operable to record operation history information that includes a content of the detected key input operation and a detection time clocked by the time clocking unit on a recording medium whenever the key input operation by the user is detected; a call reception unit operable to receive a call request message from another communication terminal; and a code judgment unit operable to judge whether the received call request message includes an acquisition request identification code showing the call request message to be an acquisition request for operation history information. Furthermore, the transmission control unit may be configured to have the mobile telephone transmit the operation history information recorded on the recording medium to the other communication terminal if the acquisition request identification code is included.

Since the entity/person monitoring emergencies is able, on demand, to acquire operation history information that provides data for determining whether or not an emergency has occurred, it is possible, according to this structure, to gauge the user's situation.

BRIEF DESCRIPTION OF THE DRAWINGS

These and other objects, advantages, and features of the invention will become apparent from the following description thereof taken in conjunction with the accompanying drawings, which illustrate a specific embodiment of the present invention.

In the drawings:

FIG. 2 shows a specific example of an input operation table;

DETAILED DESCRIPTION OF THE PREFERRED EMBODIMENT

A monitoring device in a preferred embodiment of the present invention incorporates a mobile telephone having a radio transmit/receive function.

Figure 1:
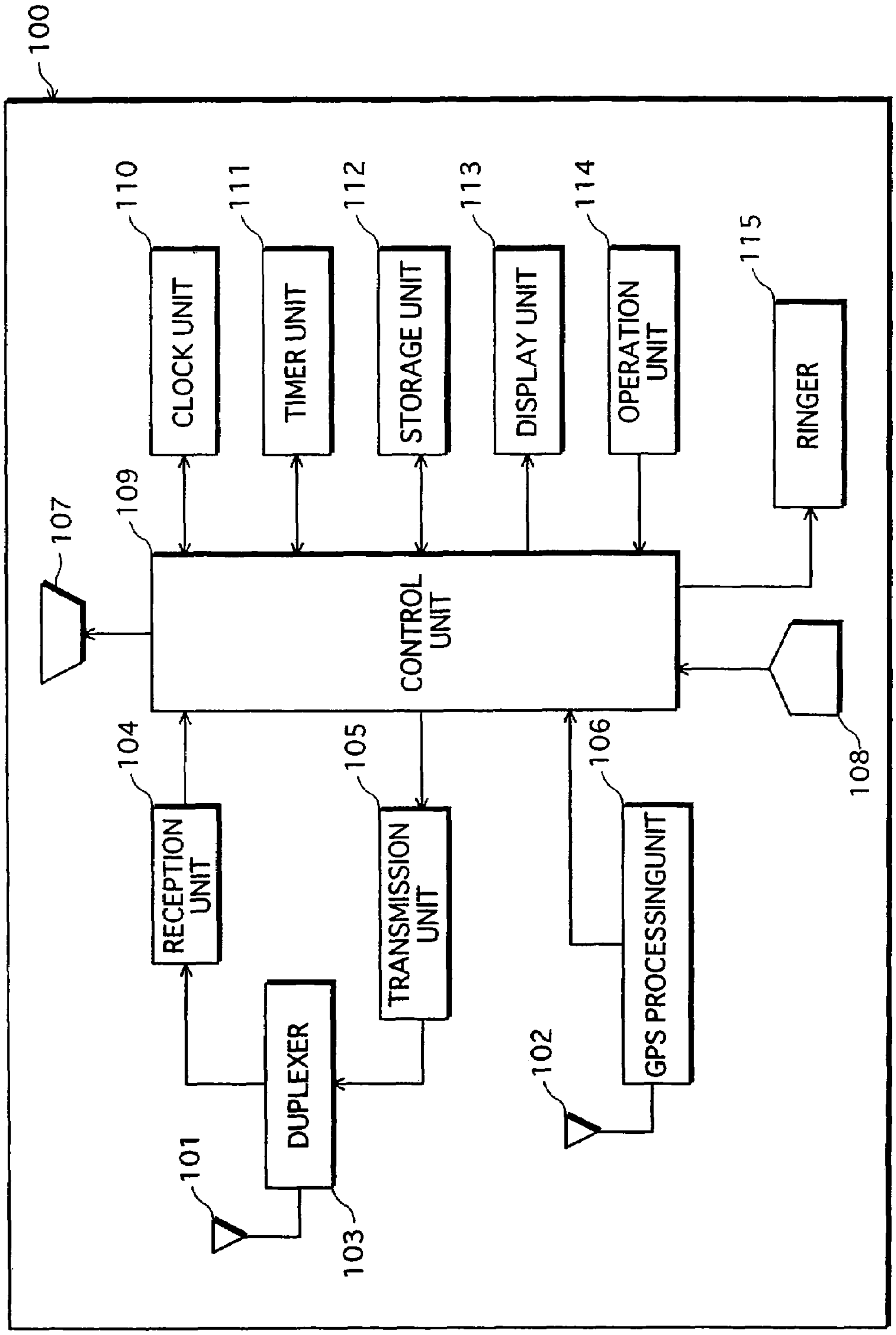
FIG. 1 is a functional block diagram showing a structure of a monitoring device 100.

FIG. 1 is a functional block diagram showing a structure of a monitoring device 100 in the preferred embodiment. Monitoring device 100 is, as shown in FIG. 1, constituted from an antenna 101, a GPS (global positioning system) antenna 102, a duplexer 103, a reception unit 104, a transmission unit 105, a GPS processing unit 106, a speaker 107, a microphone 108, a control unit 109, a clock unit 110, a timer unit 111, a storage unit 112, a display unit 113 an operation unit 114, and a ringer 115.

Duplexer 103 outputs radio communication waves inputted via antenna 101 to reception unit 104, and transmits radio communication waves inputted from transmission unit 105 via antenna 101.

Reception unit 104 demodulates communication waves inputted from duplexer 103, and outputs the demodulated communication waves to control unit 109 as communication data.

Here, "communication data" includes image data, the voice data of telephone calls, and character information such as an emergency notification message and operation history information.

The emergency notification message and operation history information are described in a later section.

Transmission unit 105 modulates communication data inputted from control unit 109, and outputs the modulated communication data to duplexer 103 as radio communication waves.

GPS processing unit 106 receives, via GPS antenna 102 at regular time intervals, position information relating to monitoring device 100 transmitted from a GPS satellite, and outputs the received information to control unit 109.

Here, "position information" is information showing the longitude and latitude of monitoring device 100.

Clock unit 110 clocks the present time (including day/month/year), and outputs the clocked time to control unit 109 when instructed by control unit 109.

Timer unit 111 clocks a preset judgment period for judging in emergency-monitor processing (described below) whether an input operation from the user has been detected, and outputs the clocked period to control unit 109 when instructed by control unit 109.

Storage unit 112 stores information including an input operation table, a judgment period, an emergency notification message, operation history information, timeslot information, an email address and telephone number of an emergency notification target, position-shift judgment thresholds, warning tone data, and a maximum ring number.

Here, the "input operation table" is a table showing the relationship between the types of key inputs inputted from operation unit 114 and the description of corresponding operations. The table may be structured to include all of the key inputs or only particular types. During the emergency-monitor processing described below, a judgment is made as to whether an input operation was detected within the judgment period, with respect to the types of key inputs included in the input operation table.

Here, all of the types of key inputs are included in the input operation table.

FIG. 2 shows a specific example of the input operation table.

Figure 3:
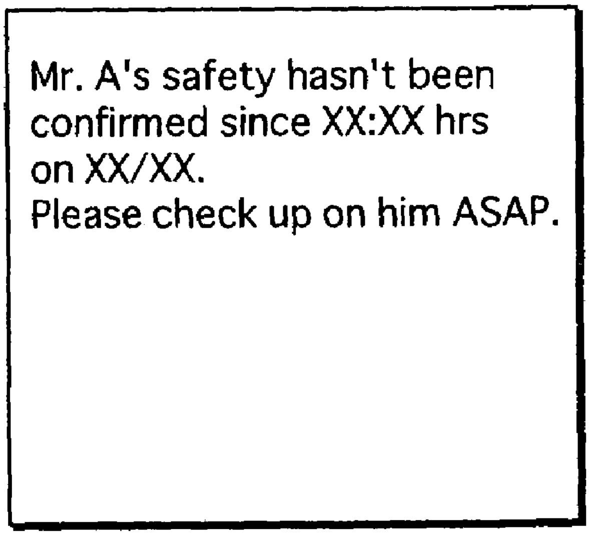
FIG. 3 shows a specific example of an emergency notification message.

The "emergency notification message" in the emergency-monitor processing is a character or voice message indicating that the user's safety hasn't been confirmed, this message being notified to an emergency notification target when judged that there is an emergency. Notification of the emergency notification message to the emergency notification target may be performed by sending the message to the emergency notification target's email address stored in storage unit 112, or in the case of the message being a voice message, notification may be performed by calling the emergency notification target's telephone number and sending the voice message when the emergency notification target answers the call. FIG. 3 shows a specific example of an emergency notification message. Here, an exemplary character message is shown, although in the case of a voice message, a message having the content shown in FIG. 3 may be played back to notify the emergency notification target.

The "operation history information" is information showing the content of key input operations and the date-time on which key input operations were performed, this information being recorded in storage unit 112 by control unit 109 whenever a key input operation from a user is detected in the emergency-monitor processing.

Figure 4:
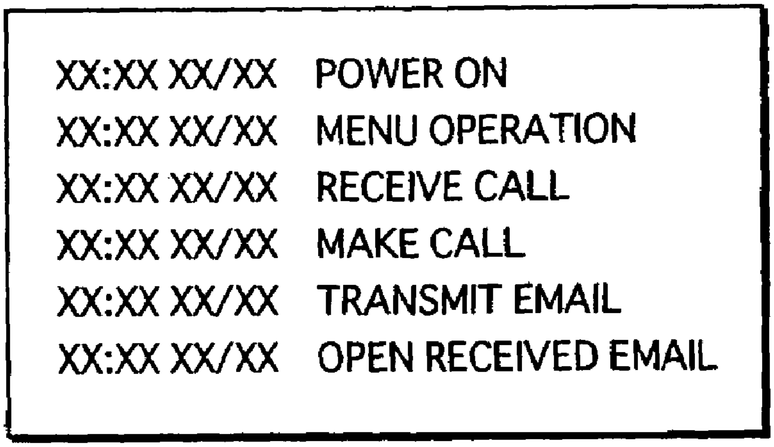
FIG. 4 shows a specific example of operation history information.

FIG. 4 shows a specific example of operation history information.

The "timeslot information" shows a time period set by the user for execution of the emergency-monitor processing.

The "position-shift judgment thresholds" are the thresholds for temporal changes in the latitude and longitude shown in the position information, and are used in the emergency-monitor processing to judge whether monitoring device 100 has shifted position.

The "warning tone data" is data for a warning tone emitted via ringer 15 in the emergency-monitor processing.

The "maximum ring number" is the maximum number of times that the warning tone is to be emitted via ringer 115.

Display unit 113 displays image data, character information, and the like inputted from control unit 109.

Operation unit 114, which has input keys such as ten keys, a power-on key and a call key, receives various key inputs (e.g. a call key input) from the user via the inputting of input keys, and outputs received key inputs to control unit 109 as input signals.

Ringer 115, on receipt of warning tone data from control unit 109, sounds off to emit a warning tone based on the warning tone data.

Control unit 109 is constituted from a microprocessor, ROM (read only memory), RAM (random access memory) and the like, and performs comprehensive controls relating to monitoring device 100 in accordance with a control program stored in ROM.

Control unit 109 also executes emergency-monitor processing in accordance with an emergency-monitoring program stored in ROM.

The following description relates to the emergency-monitor processing performed by control unit 109.

Figure 5:
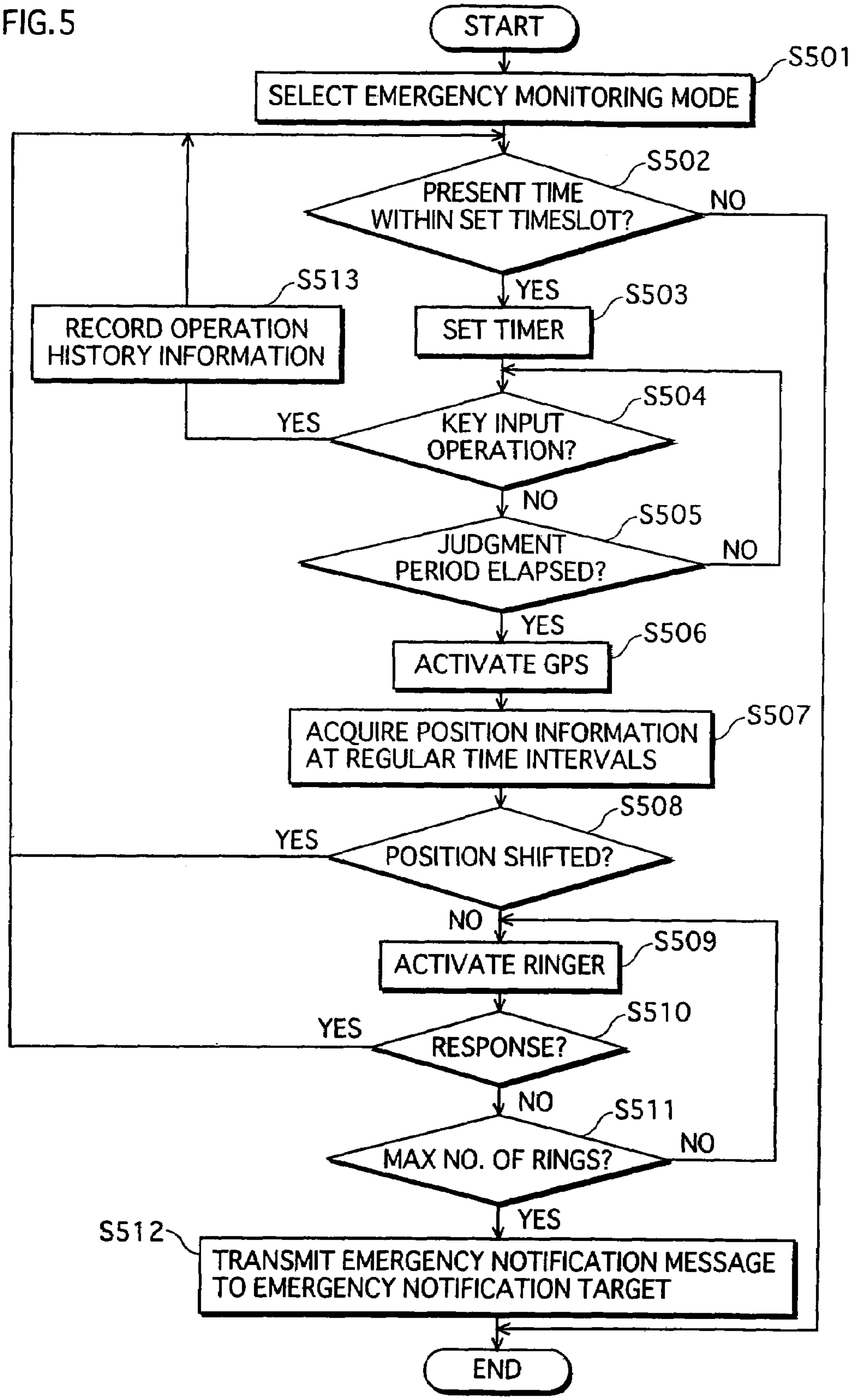
FIG. 5 is a flowchart showing emergency-monitor processing.

FIG. 5 is a flowchart showing the operations described above.

Control unit 109, on receipt of an emergency-monitoring mode selection instruction from operation unit 114 (step S501), acquires the present time from clock unit 110, reads the timeslot information from storage unit 112, and judges whether the present time is within the timeslot shown in the timeslot information (step S502).

If outside the timeslot (step S502=NO), control unit 109 ends the emergency-monitor processing. If within the timeslot (step S502=YES), control unit 109 reads the judgment period from storage unit 112, sets the timer (step S503), starts clocking the judgment period, and judges whether there has been a key input operation from the user by determining whether an input signal has been inputted from operation unit 114 (step S504).

If there has been a key input operation (step S504=YES), control unit 109 reads the input operation table from storage unit 112, identifies the key input type based on the inputted signal, and reads the operation content corresponding to the input key type identified from the input operation table. Control unit 109 then acquires the present time from clock unit 110, creates operation history information based on the acquired present time and the description of the read operation content, records the created information in storage unit 112 (step S513), and returns to step S502.

If there has not been a key input operation (step S504=NO), control unit 109 acquires the clocked time period from timer unit 111, and judges whether the judgment period has elapsed (step S505).

If the judgment period has not elapsed (step S505=NO), control unit 109 returns to step S502. If the judgment period has elapsed (step S505=YES), control unit 109 instructs GPS processing unit 106 to activate the GPS (step S506), acquires the position information inputted from GPS processing unit 106 at regular intervals (step S507), compares the acquired piece of position information with the previously acquired piece, calculates the change in the latitudinal and longitudinal values shown by both pieces of position information, and judges whether the position of monitoring device 100 has shifted by determining whether the calculated change is greater than the respective position-shift judgment thresholds for latitude and longitude stored in storage unit 112 (step S508).

If the position has shifted (step S508=YES), control unit 109 returns to step S502. If the position has not shifted (step S508=NO), control unit 109 reads warning tone data from storage unit 112, outputs the read data to ringer 115, has ringer 115 sound off (step S509) to emit the warning tone, increments a variable k (here, the initial value is set to 0) for counting the number of rings, and judges whether there has been a response from the user by determining whether an input signal from operation unit 114 has been detected (step S510).

If there has been a response (step S510=YES), control unit 109 returns to step S502. If there has not been a response (step S510=NO), control unit 109 judges whether the value of variable k has reached the maximum ring number stored in storage unit 12 (step S511).

If the maximum ring number has not been reached (step S511=NO), control unit 109 returns to step S509. If the maximum ring number has been reached (step S511=YES), control unit 109 reads the email address of the emergency notification target and the emergency notification message from storage unit 112, and sends the read message to the read address via transmission unit 105 (step S512).

Related Matters

A monitoring device 100 pertaining to the present invention has been described above based on a preferred embodiment, although the present invention is not, of course, limited to this preferred embodiment.

(1) For example, although monitoring device 100 is described in the preferred embodiment as executing the emergency-monitor processing to determine whether or not there is an emergency relating to the user, the emergency notification target may use a mobile telephone to request the acquisition of operation history information, acquire the operation history information, and judge the user's situation based on the acquired information.

Specifically, a call request message may be created in the emergency notification target's mobile telephone that includes the telephone number of monitoring device 100 (i.e. call target) and an acquisition request identification (ID) code showing the message to be an acquisition request for operation history information. The created message may then be sent to monitoring device 100 via a base station, and on receipt of the message, control unit 109 in monitoring device 100 may judge whether an acquisition request ID code is included in the received call request message. If included, the operation history information and email address of the emergency notification target may be read from storage unit 112 without sounding ringer 115, and the read information sent to the read address. If the ID code is not included in the received message, ringer 115 may be sounded.

Also, the transmitted operation history information may be only the latest piece of operation history information to be recorded.

In this way, the entity/person monitoring emergencies is able to gauge the user's situation by acquiring operation history information for judging the occurrence of emergencies without the user's knowledge.

(2) Although the input operation table is described as including all key input types in the preferred embodiment, the key inputs may be limited to particular types frequently used by the user on a daily basis (e.g. key input to open received email). In this case, the step S504 processing in FIG. 5 is replaced by processing in which control unit 109 refers to an input operation table that includes the specified key input types, and judges whether there has been a key input operation of one of these types from the user.

(3) Although in the emergency-monitor processing of the preferred embodiment, control unit 109 determines the transmission timing of the emergency notification message depending on whether or not the maximum ring number has been reached (step S511, FIG. 5), this timing may be determined on the basis of whether a predetermined period (rather than the maximum ring number) has elapsed after ringer 115 has been sounded.

(4) Although in the preferred embodiment, ringer 115 is sounded when judged in step S508 of FIG. 5 that monitoring device 100 has not shifted position, the user may be warned using alternative methods. For example, a warning may be given by having monitoring device 100 vibrate, emit light, or generate a warning message.

(5) Although in the preferred embodiment, the step S508 processing in the emergency-monitor processing is performed irrespective of the location of monitoring device

100, control unit 109 may be structured to only perform step S508 when monitoring device 100 is outside.

Specifically, position information showing the position of premises (e.g. user's home or friend's house) where the user is likely to be in residence may be prestored in storage unit 112. Then, before performing step S508 in FIG. 5, control unit 109 may compare the position shown in position information acquired at step S507 with the position shown in the position information of the premises prestored in storage unit 112, and judge whether monitoring device 100 is positioned on premises, depending on whether the positional difference (difference in latitude/longitude) is within a predetermined range. If monitoring device 100 is on premises, the S509 to S512 processing may be performed after deactivating the GPS, and if off premises, steps S509 to S512 may be performed as described in the preferred embodiment.

In this way, emergencies can be quickly assessed on premises without redundant processing being performed, since the precision of position information is impaired in comparison to off premises due to the limited positional shifts of the monitoring device on premises.

(6) In step S508 of the preferred embodiment, control unit 109 compares acquired position information with the previously acquired piece, calculates the change in latitudinal and longitudinal values shown by both pieces, and judges whether monitoring device 100 has shifted position by determining whether the calculated change is greater than the respective position-shift judgment thresholds for latitude and longitude stored in storage unit 112. However, the judgment may be performed by determining whether there has been a change in the latitudinal and longitudinal values shown by both pieces of position information.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A monitoring device comprising:

a mobile telephone having a radio transmit/receive function;

an operation detection unit detects a key input operation by a user;

a position information acquisition unit acquires position information showing a current position of the monitoring device;

a position-shift judgment unit judges whether the position of the monitoring device has shifted, based on the acquired position information; and a transmission control unit, when the key input operation has not been detected by the operation detection unit within a preset period, and the position-shift judgment unit has judged that the position of the monitoring device has not shifted, has the mobile telephone transmit an emergency notification message to a predetermined address.

2. The monitoring device of claim 1, wherein the detection of the key input operation is performed only within a preset timeslot.

3. The monitoring device of claim 2 further comprising:

a warning generation unit emits, when the key input operation has not been detected by the operation detection unit in the preset period a warning indicating that the preset period has elapsed, wherein the transmission control unit has the mobile telephone transmit the emergency notification message to the predetermined address, only when the key input operation is not detected within a predetermined period after the warning is emitted.

4. The monitoring device of claim 2 further comprising:

a time clocking unit to clock time;

an operation history recording unit to record operation history information on a recording medium whenever the key input operation by the user is detected, the operation history information including a content of the detected key input operation and a detection time clocked by the time clocking unit;

a call reception unit receives a call request message from another communication terminal; and a code judgment unit judges whether the received call request message includes an acquisition request identification code showing the call request message to be an acquisition request for operation history information, wherein the transmission control unit has the mobile telephone transmit the operation history information recorded on the recording medium to the other communication terminal if the acquisition request identification code is included.

5. The monitoring device of claim 1 further comprising:

a warning generation unit emits, when the key input operation has not been detected by the operation detection unit in the preset period a warning indicating that the preset period has elapsed, wherein the transmission control unit has the mobile telephone transmit the emergency notification message to the predetermined address, only when the key input operation is not detected within a predetermined period after the warning is emitted.

6. The monitoring device of claim 5 further comprising:

a time clocking unit to clock time;

an operation history recording unit to record operation history information on a recording medium whenever the key input operation by the user is detected, the operation history information including a content of the detected key input operation and a detection time clocked by the time clocking unit;

a call reception unit to receive a call request message from another communication terminal; and a code judgment unit to judge whether the received call request message includes an acquisition request identification code showing the call request message to be an acquisition request for operation history information, wherein the transmission control unit has the mobile telephone transmit the operation history information recorded on the recording medium to the other communication terminal if the acquisition request identification code is included.

7. The monitoring device of claim 6 further comprising:

a ringer to sound off when the call request message is received; and an inhibiting unit to inhibit the sounding off of the ringer when the acquisition request identification code is included in the received call request message.

8. The monitoring device of claim 1 further comprising:

the position judgment unit judges whether the position shown by the acquired position information is within a predetermined range, wherein the position-shift judgment unit judges whether the position of the monitoring device has shifted, based on the acquired position information, only when the position shown by the acquired position information is outside the predetermined range.

9. The monitoring device of claim 8 further comprising:

a warning generation unit emits, when the key input operation has not been detected by the operation detection unit in the preset period a warning indicating that the preset period has elapsed, wherein the transmission control unit has the mobile telephone transmit the emergency notification message to the predetermined address, only when the key input operation is not detected within a predetermined period after the warning is emitted.

10. The monitoring device of claim 9 further comprising:

a time clocking unit to clock time;

an operation history recording unit to record operation history information on a recording medium whenever the key input operation by the user is detected, the operation history information including a content of the detected key input operation and a detection time clocked by the time clocking unit;

a call reception unit receives a call request message from another communication terminal; and a code judgment unit judges whether the received call request message includes an acquisition request identification code showing the call request message to be an acquisition request for operation history information, wherein the transmission control unit has the mobile telephone transmit the operation history information recorded on the recording medium to the other communication terminal if the acquisition request identification code is included.

11. The monitoring device of claim 10 further comprising:

a ringer to sound off when the call request message is received; and an inhibiting unit to inhibit the sounding off of the ringer when the acquisition request identification code is included in the received call request message.

12. The monitoring device of claim 8 further comprising:

a time clocking unit to clock time;

an operation history recording unit to record operation history information on a recording medium whenever the key input operation by the user is detected, the operation history information including a content of the detected key input operation and a detection time clocked by the time clocking unit;

a call reception unit receives a call request message from another communication terminal; and a code judgment unit judges whether the received call request message includes an acquisition request identification code showing the call request message to be an acquisition request for operation history information, wherein the transmission control unit has the mobile telephone transmit the operation history information recorded on the recording medium to the other communication terminal if the acquisition request identification code is included.

13. The monitoring device of claim 12 further comprising:

a ringer to sound off when the call request message is received; and an inhibiting unit to inhibit the sounding off of the ringer when the acquisition request identification code is included in the received call request message.

14. The monitoring device of claim 1 further comprising:

a warning generation unit emits, when the key input operation has not been detected by the operation detection unit in the preset period a warning indicating that the preset period has elapsed, wherein the transmission control unit has the mobile telephone transmit the emergency notification message to the predetermined address, only when the key input operation is not detected within a predetermined period after the warning is emitted.

15. The monitoring device of claim 1 further comprising:

a time clocking unit to clock time;

an operation history recording unit to record operation history information on a recording medium whenever the key input operation by the user is detected, the operation history information including a content of the detected key input operation and a detection time clocked by the time clocking unit;

a call reception unit receives a call request message from another communication terminal; and a code judgment unit judges whether the received call request message includes an acquisition request identification code showing the call request message to be an acquisition request for operation history information, wherein the transmission control unit has the mobile telephone transmit the operation history information recorded on the recording medium to the other communication terminal if the acquisition request identification code is included.

16. A monitoring device comprising:

a mobile telephone having a radio transmit/receive function;

an operation detection unit detects a key input operation by a user;

a transmission control unit, when a preset period has elapsed since the key input operation was last detected, has the mobile telephone transmit an emergency notification message to a predetermined address;

a time clocking unit to clock time;

an operation history recording unit to record operation history information on a recording medium whenever the key input operation by the user is detected, the operation history information including a content of the detected key input operation and a detection time clocked by the time clocking unit;

a call reception unit receives a call request message from another communication terminal; and a code judgment unit judges whether the received call request message includes an acquisition request identification code showing the call request message to be an acquisition request for operation history information, wherein the transmission control unit has the mobile telephone transmit the operation history information recorded on the recording medium to the other communication terminal if the acquisition request identification code is included.

17. A monitoring method in a monitoring device that includes a mobile telephone having a radio transmit/receive function, comprising the steps of:

detecting a key input operation by a user;

acquiring position information showing a current position of the monitoring device;

judging whether the position of the monitoring device has shifted, based on the acquired position information; and having the mobile telephone transmit an emergency notification message to a predetermined address, when the key input operation has not been detected in the operation detection step in a preset period, and furthermore, the position of the monitoring device has been judged in the position-shift judgment step to have not shifted.

* * * * *